United States Patent [19]
Bunn, Jr.

[11] 3,933,614
[45] Jan. 20, 1976

[54] PRESSURE VESSEL FOR HYDROGEN GENERATOR

[75] Inventor: Julian W. Bunn, Jr., Raleigh, N.C.

[73] Assignee: Trienco, Inc., Raleigh, N.C.

[22] Filed: July 7, 1975

[21] Appl. No.: 593,751

[52] U.S. Cl. ................. 204/266; 204/129; 204/260
[51] Int. Cl.² ..... C25B 1/02; C25B 1/04; C25B 1/10
[58] Field of Search ........... 204/129, 252, 259, 260, 204/263, 266

[56] References Cited
UNITED STATES PATENTS

| | | |
|---|---|---|
| 3,256,504 | 6/1966 | Fidelman ..................... 204/129 X |
| 3,346,470 | 10/1967 | Henes .................................. 204/129 |
| 3,448,035 | 6/1969 | Serfass ........................... 204/266 X |
| 3,761,382 | 9/1973 | Hammond et al. ................. 204/266 |

Primary Examiner—T. Tung
Assistant Examiner—A. C. Prescott
Attorney, Agent, or Firm—B. B. Olive; Richard S. Faust

[57] ABSTRACT

The pressure vessel of a hydrogen generator is provided with closely-spaced cylindrical screen electrodes and a dielectric coating on the vessel's internal surfaces in order to improve generator efficiency and life.

4 Claims, 2 Drawing Figures

PRESSURE VESSEL FOR HYDROGEN GENERATOR

BACKGROUND OF THE INVENTION

1. Field of the Invention:

The invention relates to apparatus for generating hydrogen, more specifically to the internal construction of the pressure vessel of such a generator.

2. Description of the Prior Art:

It is a well-known process to obtain hydrogen from the disassociation of water by electrolysis. Hydrogen generators using this principle generally employ a pressurized container in which the electrodes are situated and the oxygen and hydrogen gases are collected separately. U.S. Pat. No. 3,761,382 represents an important improvement in the generation and purification of hydrogen. The novel pressure vessel of this patented generator includes a tank member which is hermetically secured to a closed top member. A controlled volume of electrolytic solution is maintained in the tank during operation. The hydrogen electrode (cathode) comprises a cylindrical probe member which is mounted in the center of the tank. An open-ended, cylindrical screen oxygen electrode (anode) surrounds the hydrogen electrode. The electrodes are spaced by a plastic cylindrical sleeve member and a woven asbestos sleeve cover.

The pressure vessel of the patented generator has been found to have several drawbacks. First, an appreciable electrical flow from the anode to the internal wall of the pressure vessel has resulted in reduced efficiency of the generator. Second, the approximate ¼ inch space between the anode and cathode has resulted in a relatively high resistance to current flow between anode and cathode. By reducing the space between anode and cathode, the generating capacity of the generator can be improved by increasing the current flow for a given voltage. The high resistance has also caused the generator to run at elevated temperatures thereby reducing the life of the asbestos screen and other internal components. Third, the vessel interior surface is continuously exposed to a 18% solution of sodium hydroxide, oxygen and hydrogen. It has been found that these substances corrode and otherwise tend to deteriorate the interior surfaces of the pressure vessel.

It is the purpose of the present invention to overcome the disadvantages while maintaining the many advantages of the generator pressure vessel of U.S. Pat. No. 3,761,382.

SUMMARY OF THE INVENTION

The apparatus of the invention provides a novel pressure vessel construction for electrolytic hydrogen or oxygen generators. The pressure vessel includes a top member which is hermetically secured to a tank member. Appropriate openings are provided in the top for introducing water into the tank, removing hydrogen and oxygen gas from the tank and securing the hydrogen and oxygen electrode terminals. The tank houses the hydrogen and oxygen electrodes which are cylindrical screen members separated only by a woven asbestos curtain and an electrically insulated, thin-wall steel tube. The interior surface of the tank is also electrically insulated to prevent power loss to such surface.

DESCRIPTION OF THE PREFERRED EMBODIMENT

Figure 1:
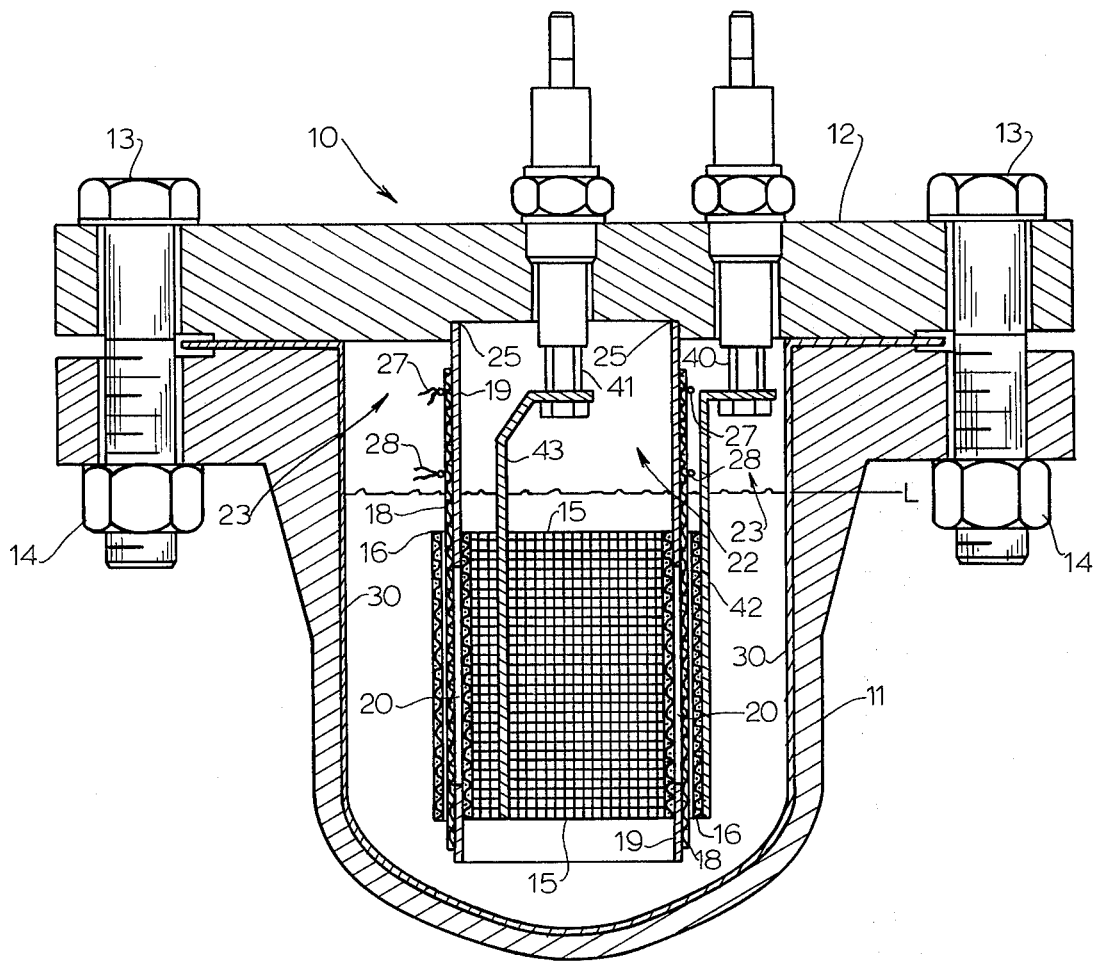
FIG. 1 is a section view of the pressure vessel showing the position of the hydrogen and oxygen electrodes and with the water inlet, hydrogen and oxygen outlets, and level control means not shown but with the invention improvements being shown.

As best shown in FIG. 1, pressure vessel 10 comprises a tank member 11 and top member 12. In specific embodiment, tank 11 is a standard 4-inch weld cap welded to a standard 4-inch weld neck flange and top member 12 is a 4-inch blind flange. Members 11 and 12 are secured together in a gas-tight seal by bolts 13 and nuts 14. Tank 11 encloses four cylindrical components: hydrogen electrode 15, oxygen electrode 16, asbestos curtain 18, and tube member 19, which are arranged in a closely spaced, concentric manner.

Thin-wall, slotted tube member 19 is secured in a gas-tight connection 25 to the interior surface of top member 12 and extends downwardly within tank 11 to a point approximately one-half inch from the bottom surface of tank 11. Tube 19 is made from 20-gauge carbon steel and is provided with a plurality of vertical slots 20 which leave only sufficient skeleton to support woven asbestos curtain 18. Curtain 18 is wrapped around tube 19 and secured by strings 27, 28. Curtain 18 covers slots 20 and prevents the passage of either oxygen or hydrogen through the slots.

Figure 2:
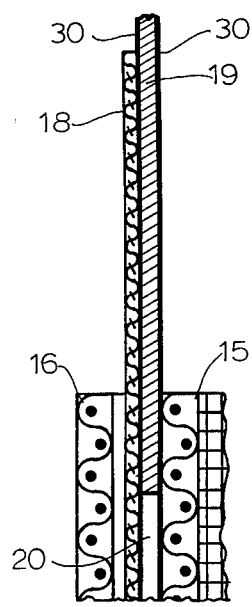
FIG. 2 is an enlarged section view of the electrodes, tube member and asbestos sleeve shown in FIG. 1.

An oxygen electrode terminal 40 extends through top 12 into tank 11. Attached to terminal 40 is an electrode connector 42 which connects terminal 40 to the oxygen electrode screen 16. Electrode screen 16 is located immediately outside of asbestos curtain 18. In specific embodiment, electrode 16 is made from a nickel 200 screen having 12 by 12 mesh and 0.032 inch diameter wire. Electrode 16 serves as the anode in the electrolysis process. Screen electrode 16 covers and extends slightly above and below slots 20 in tube 19. The stainless steel hydrogen electrode screen 15 is connected to hydrogen electrode terminal 41 by electrode connector 43. Electrode 15 is made from 304 stainless steel screen having 14 by 14 mesh and 0.025 inch wire. Electrode 15 is mounted inside of tube 19 to serve as the cathode. As best shown in FIG. 2, electrodes 15 and 16 are separated only by the thicknesses of curtain 18 and tube 19.

Slots 20 in tube 19 allow for the passage of ions between the electrodes 15, 16 while the asbestos curtain 18 serves as a barrier to the flow of gas through the slots. The 20-gauge steel construction of tube 19 provides a 0.0375 inch wall thickness. It has been found that this approaches the minimum wall thickness which will provide structural integrity at operating temperatures. As discussed previously, the thickness of tube 19 determines the distance between electrodes 15 and 16. By placing electrodes 15, 16 in a close spatial relationship, the resistance to electrical flow between the electrodes is decreased thereby increasing the hydrogen output per unit of electrical energy consumed. A further advantage of placing the electrodes close together is that heat generation is kept at a minimum thereby increasing the life of the internal components. Tube 19 is made from an electrical conducting material; and, therefore, it must be coated with an insulating coating 30 since it may be in physical contact with electrode 15 and is positioned only a short distance from electrode 16. The preferred coating is No. ECB-136A Epoxy manufactured by Polymer corporation of Reading, Pennsylvania. Polymer Epoxy No. ECA-1283 and certain polyvinyl chlorides with good dielectric qualities have also been used successfully. It has been found that if the interior wall surface of tank 10 is made from an electrical conducting material, there will be a power loss due to electrical flow from electrode 16 to the wall surface; therefore, the interior wall surface of tank 11 is coated with coating 30, as used on tube 19.

The operation of pressure vessel 10 will now be described. Before start-up, the level of the electrolytic solution in tank 11 is brought to level L which is sufficiently high to assure that the solution completely covers electrode screens 15 and 16. An electric potential is created between electrodes 15 and 16 thereby generating oxygen and hydrogen by electrolysis in the manner well known to those skilled in the art. Oxygen collects in oxygen collection space 23 and hydrogen collects in hydrogen collection space 22. Gas-tight seal 25 prevents mixing of the gases. The oxygen is bled to the atmosphere from collection space 23 through a suitable relief valve (not shown) and the hydrogen is conveyed from the generator through suitable tubing (not shown) at such rates that the level of caustic fluid remains at a satisfactory level for further electrolysis. Suitable control means (not shown) are provided to keep the electrolytic solution at operative levels.

In summary, the novel and efficient construction of pressure vessel 10 leads to increased efficiency in the operation of a hydrogen generator of the type described in U.S. Pat. No. 3,761,382. The epoxy coating 30 on the interior wall surface of tank 11 prevents corrosion due to the continuous exposure to the caustic electrolytic solution. Coating 30 also serves to insulate the tank wall from electrode screen 16 thereby eliminating any electrical flow from electrode 16 to the wall. By coating slotted tube member 19 with coating 30, it is possible to use an electrically insulated, thin-wall steel tube instead of the thicker plastic tube members of the prior art. As a result there is a close spatial relationship between electrodes 15 and 16 which reduces the resistance between electrodes and allows a higher current flow at a constant voltage. It has been found that this reduction in electrical resistance allows the hydrogen generator to produce approximately 25% more hydrogen at constant power consumption. The lower resistance also cuts back on heat generation in tank 11 and thereby increased the life of the internal components.

Since the present invention follows U.S. Pat. No. 3,761,382, a more complete understanding of the invention, its advantages and operation, may be had by resort to that patent and whose teachings have not been repeated here.

What is claimed is:

1. In an electrolytic hydrogen or oxygen generator apparatus of the type having a pressure tank adapted to contain an electrolytic solution including water and an electrolyte, and having a water inlet, an oxygen outlet and a hydrogen outlet, the improved pressure tank assembly comprising, in combination:
   a. a metal tank member having a closed bottom and an open top;
   b. a cover member hermetically secured to the open top of said tank member, said cover member providing openings for said water inlet, oxygen outlet and hydrogen outlet;
   c. a thin-wall integral cylindrical tube member having electrically insulating surfaces and positioned centrally inside of said tank member, the upper end portion of said tube member being connected to said cover member in a gas-tight seal and having a lower open end portion terminating immediately above the closed bottom surface of said tank member and including openings cut therein;
   d. a woven, cylindrical asbestos curtain covering said tube openings and adapted to act as an impervious barrier to hydrogen and oxygen gas flow while allowing the passage of ions and electrolytic solution therethrough;
   e. oxygen electrode means mounted inside said tank member and having electrically conducting means extending through said cover, said oxygen electrode means comprising a fine mesh screen electrode wrapped in close spaced relation around said asbestos curtain and covering said tube openings;
   f. hydrogen electrode means mounted inside said tank member and having electrically conducting means extending through said cover, said hydrogen electrode means comprising a fine mesh screen electrode positioned inside of said tube and being coaxial with said tube in a close spaced relation therewith and having a height sufficient to cover said tube openings; and
   g. an electrically insulating coating impervious to and inert with respect to hydrogen, oxygen, and sodium hydroxide applied to the entire interior side and bottom wall surfaces of said tank member.

2. The apparatus of claim 1 wherein said oxygen electrode screen is a nickel screen and said hydrogen electrode screen is a stainless steel screen.

3. The apparatus of claim 1 wherein said tube is made of steel having a thickness less than 0.040 inches and covered with an electrically insulating coating selected from the group consisting of epoxy and polyvinyl chloride.

4. The apparatus of claim 1 wherein said electrically insulating coating applied to the interior surfaces of said tank member is selected from the group consisting of epoxy and polyvinyl chloride.

* * * * *